United States Patent [19]
Cwynar et al.

[11] Patent Number: 5,528,685
[45] Date of Patent: Jun. 18, 1996

[54] TRANSFORMERLESS HYBRID CIRCUIT

[75] Inventors: Donald T. Cwynar, Reading; Donald R. Laturell, Allentown, both of Pa.

[73] Assignee: AT&T Corp., Murray Hill, N.J.

[21] Appl. No.: 272,180

[22] Filed: Jul. 8, 1994

[51] Int. Cl.$^6$ .................................................. H04M 19/00
[52] U.S. Cl. ........................................ 379/405; 379/391
[58] Field of Search ............................. 379/98, 405, 391, 379/392, 408, 395, 344

[56] References Cited

U.S. PATENT DOCUMENTS

| | | | |
|---|---|---|---|
| 4,056,719 | 11/1977 | Waaben | 250/199 |
| 4,479,066 | 10/1984 | Embree | 307/350 |
| 4,491,700 | 1/1985 | Tahara | 379/405 |
| 4,715,064 | 12/1987 | Claessen | 379/392 |
| 4,807,283 | 2/1989 | Pyhälammi | 379/403 |
| 4,989,243 | 1/1991 | Choi | 379/402 |
| 5,029,203 | 7/1991 | Ikefuji | 379/392 |
| 5,245,654 | 9/1993 | Wilkison | 379/405 |
| 5,280,526 | 1/1994 | Laturell | 379/408 |

FOREIGN PATENT DOCUMENTS

| | | | |
|---|---|---|---|
| A-0 572175 | 5/1993 | European Pat. Off. | H04M 19/00 |
| A-2184330 | 6/1987 | United Kingdom | H04M 1/58 |

OTHER PUBLICATIONS

At&T Microelectronics Interface Circuit for Optically Coupled Data Access Arrangements.

*Primary Examiner*—Jeffery Hofsass
*Assistant Examiner*—Thomas F. Presson
*Attorney, Agent, or Firm*—Scott W. McLellan

[57] ABSTRACT

An electronic hybrid useful in telephone line-powered Data Access Arrangements. The hybrid has a transmit amplifier with an output driving the base of a bipolar transistor. The emitter of the transistor is connected to a sense resistor which is, in turn, connected to one wire of a telephone line. The collector of the transistor connects to another wire of the telephone line. A summing node couples together signals on the telephone line and signals across the sense resistor such that the remaining signal on the summing node is substantially the signal received from the telephone line without the signal to be transmitted.

10 Claims, 1 Drawing Sheet

TRANSFORMERLESS HYBRID CIRCUIT

BACKGROUND OF THE INVENTION

CROSS-REFERENCE TO RELATED APPLICATION

This application is related to a co-pending patent application titled "Transformerless Hybrid Circuit Having Direct Powered Line-Side Amplifiers", by D. T. Cwynar and D. R. Laturell, Ser. No. 08/272,501, filed simultaneously with, and assigned to the same assignee, as this application.

FIELD OF THE INVENTION

This invention relates to telephone hybrids in general and, more particularly, to active hybrids generally used in transformerless Data Access Arrangements.

DESCRIPTION OF THE PRIOR ART

For purposes here, the term Data Access Arrangement or DAA is used to refer to a transformerless hybrid and isolation means generally, although it is understood that more components may be necessary to form a complete DAA, such as a line switch and loop current control.

See U.S. Pat. No. 5,280,526 assigned to the same assignee as this invention and is included herein by reference. The circuits shown in FIGS. 2 and 3 of the above-identified patent form the hybrid and isolation functions of a Data Access Arrangement (DAA). The disclosed DAA uses conventional operational amplifiers powered from a telephone line connected between terminal 100 and ground (except amplifier 80 in FIG. 3).

The DAA of the aforementioned U.S. Patent includes a hybrid that couples to the two-wire telephone line. The hybrid converts the two-wire telephone line (bidirectional) path into a unilateral receive path and a unilateral transmit path. Signals arriving on the telephone line pass through the receive path over an optical isolator 44 to a modem 75 or the like. Similarly, signals from a modem 75 or the like pass through the transmit path over another optical isolator 42 and are impressed on the telephone line.

The received signal strength presented to the hybrid from a mismatched telephone line (the telephone line being terminated at the DAA with an impedance different from the match impedance) is usually very weak, typically many tens of decibels below the signal strength of the transmitted signal from the DAA to the telephone line. Because the received signal is so weak, unless the transmitted signal from the transmit path is removed from the amplifier 50, the received signal will be overridden by the transmitted signal and obliterated.

For the DAA to adequately send the receive signal over the optical isolator 44 to a modem or the like, a line-powered amplifier 50 amplifies the receive signal and performs pan of the hybrid function. To cancel the transmit signal from the amplifier 50, the signal on the telephone line (through resistor 55 and capacitor 57) and the transmitted signal (through resistor 52 and capacitor 56) are summed together at the inverting input of the amplifier 50. This arrangement works well, but some residual transmitted signal and signal distortion contributed by amplifier 60 and transistor 67 are not canceled by amplifier 50.

Thus, it is desirable to provide a hybrid arrangement with better transmitted signal cancellation capability.

SUMMARY OF THE INVENTION

This and other aspects of the invention may be obtained generally in a hybrid circuit that couples a transmit signal from a transmit path to a bidirectional path and couples a received signal from the bidirectional path to a receive path with the transmit signal suppressed. The hybrid has a variable current device, responsive to the transmit signal and disposed in series with the bidirectional path, a sensing resistor disposed in series with the variable current device, and a summing node coupling to the sensing resistor and to the bidirectional path. The sense resistor generates a voltage in response to the current through the variable current element. The summing node has thereon the received signal from the bidirectional path without any substantial signal from the transmit path.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
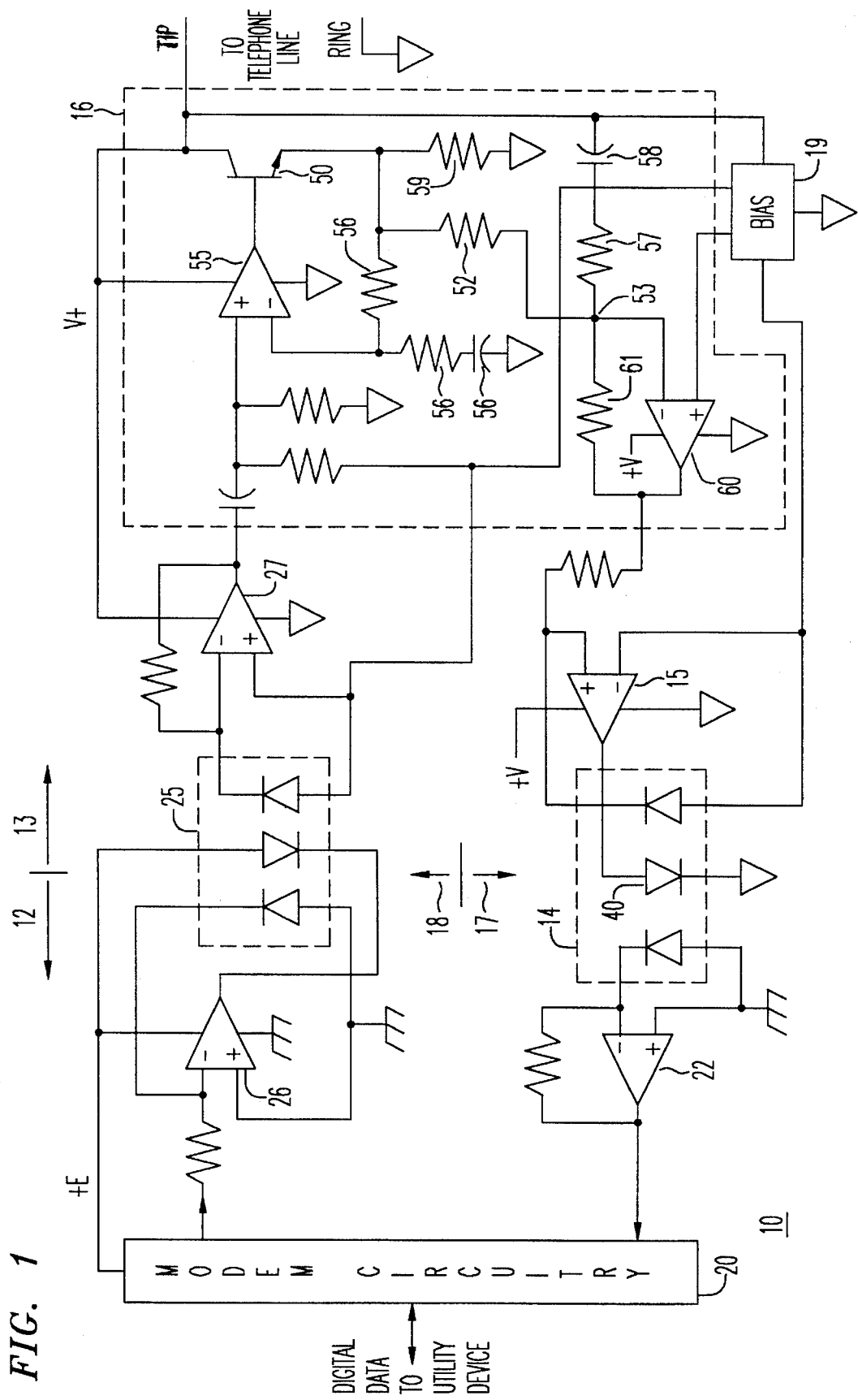
FIG. 1 is a simplified schematic drawing of an active hybrid according to one exemplary embodiment of the invention.

As discussed below in more detail and in accordance with an embodiment of the invention shown in FIG. 1, the data access arrangement (DAA) 10 has hybrid circuit 16 that couples a transmit signal from a transmit path 18 to a bidirectional path (a telephone line) and couples a received signal from the bidirectional path to a receive path 17 with the transmit signal suppressed. The hybrid has a variable current device 50, responsive to the transmit signal and disposed in series with the bidirectional path, a sensing resistor 51 disposed in series with the variable current device 50, and a summing node 53 coupling to the sensing resistor 51 and to the bidirectional path. The sense resistor 51 generates a voltage in response to the current through the variable current element 50. The summing node 53 has thereon the received signal from the bidirectional path without any substantial signal from the transmit path.

In more detail, the DAA 10 in FIG. 1 has an application portion 12 and a telephone line-side portion 13. Both portions 12, 13 have a receive path 17 and a transmit path 18. The receive path 17 and the transmit path 18 are each unilateral paths from and to the hybrid 16. Hybrid 16 couples to the two-wire telephone line (a bidirectional path) and acts as a two-wire to four-wire converter to couple the bidirectional telephone line path to the unilateral receive path 17 and the unilateral transmit path 18. Signals arriving on the telephone line pass through the receive path 17 to the modem circuitry 20. Similarly, signals from a modem 20 pass through the transmit path 18 and are impressed on the telephone line for transmission.

Operation of the hybrid 16 is similar to the Output Driver and Near-end Echo Canceling Subcircuits in the above-referenced patent application. The only substantial difference between what is disclosed here and what is disclosed in the above-referenced patent is the feedback path provided by resistor 52 for canceling the transmitted signal from the received signal. This provides for superior cancellation of the transmitted signal than in the hybrid disclosed in the abovereferenced patent.

Briefly, a signal to be transmitted enters the active hybrid 16 and is amplified by transmit amplifier 55. Amplifier 55 drives a bipolar transistor 50, operating as a variable current device. The amount of current passed by the transistor 50 is substantially determined by the signal applied to the amplifier 55 due to a feedback loop set up by the current sensing resistor 51 and a feedback network 56. Transistor 50, its collector connecting to one wire of the telephone line and its emitter connecting to the other wire via sense resistor 51, impresses onto the telephone line the transmitted signal by varying the current through the telephone line. The voltage developed across the sense resistor 51 very closely matches the transmitted signal on the telephone line while being substantially devoid of the received signal due to the high impedance nature of the transistor 50.

Signals on the telephone line are coupled to a summing node 53 by resistor 57 and capacitor 58. The transmitted signal is also added to the summing node via resistor 52, but has the opposite phase as that through resistor and capacitor 57, 58. Thus, the remaining signal on node 53 is just the received signal if the proper values of resistor 52 and 57 are chosen. Receive amplifier 60, having a feedback resistor 61 to set the gain of the amplifier 60, controls the amplitude of the received signal for presentation to LED driver amplifier 15.

Galvanic isolation between the portions 12, 13 is accomplished by optical isolation. Optical isolation in the receive path 17 is provided by opto-isolator 14, driver amplifier 15 and photodetector amplifier 22. Similarly, in the transmit path 18, optical isolation is provided by opto-isolator 25, driver amplifier 26, and photodiode amplifier 27. The operation of the above is similar to that described in connection with FIG. 3 of the above-referenced patent. An exemplary opto-isolator having an LED 40 light source and two photodiodes is a Siemens IL-300 opto-isolator.

Bias circuit 19 provides substantially invariant bias voltages and currents to the various circuits in the DAA 10.

The amplifiers on the application portion 12 (here amplifiers 22 and 26) are powered from, for example, an exemplary modem circuit 20. In contrast, the amplifiers on the line-side portion 13 (here amplifiers 15, 27 and those in the hybrid 16) are powered directly from the telephone line. No voltage regulation or passive filtering is provided or needed, although it is understood that regulation or filtering may be provided if desired. To allow for the direct powering of the amplifiers by telephone line current, the amplifiers should not draw a supply current that varies with the signal amplified.

While a modem circuit is shown as the application for the disclosed DAA 10 (FIG. 1 ), it is understood that other uses may be found for the disclosed invention, such as facsimile machines, phone patches, answering machines, etc.

Except for the optical isolators 14, 15, all of the circuitry shown in the line-side portion 13 of the DAA 10 has been implemented on a single chip.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

We claim:

1. A hybrid circuit, for coupling a transmit signal from a transmit path to a bidirectional path and for coupling a received signal from the bidirectional path to a receive path with the transmit signal suppressed, having:

a variable current device, responsive to the transmit signal, disposed in series with the bidirectional path;

a sensing resistor, disposed in series with the variable current device, which generates a voltage in response to the current through the variable current element; and, a summing node coupling to the sensing resistor and to the bidirectional path;

wherein the summing node has thereon the received signal from the bidirectional path substantially without a signal from the transmit path.

2. The hybrid recited in claim 1, further characterized by:

a transmit amplifier having an input coupling to the transmit path and an output coupling to the bidirectional path;

a receive amplifier having an input coupling to the bidirectional path at a summing node and an output coupling to the receive path.

3. The hybrid recited in claim 2, wherein the variable current element is a bipolar transistor having a base connected to the output of the transmit amplifier, an emitter connected to the series resistor, and a collector coupling to the bidirectional path.

4. The hybrid recited in claim 3, wherein the transmit amplifier has a feedback resistor disposed between an inverting input of the transmit amplifier and the series resistor.

5. The hybrid recited in claim 4, wherein the receive amplifier has a feedback resistor disposed between the output of the receive amplifier and the summing node.

6. A modem, coupled to the transmit and receive path of a hybrid as recited in claim 5.

7. A hybrid circuit, for coupling a transmit signal from a transmit path to a bidirectional path and for coupling a received signal from the bidirectional path to a receive path with the transmit signal suppressed, having:

a transmit amplifier having an input coupling to the transmit path and an output coupling to the bidirectional path;

a receive amplifier having an input coupling to the bidirectional path at a summing node and an output coupling to the receive path;

a bipolar transistor having an emitter and a base, the base connecting to the output of the transmit amplifier; and, a sense resistor, disposed in series with the emitter of the transistor, which generates a voltage in response to the current through the transistor;

CHARACTERIZED BY:

a series resistor coupling the summing node to the sense resistor.

8. The hybrid recited in claim 7, wherein the transistor has a collector coupling to the bidirectional path.

9. The hybrid recited in claim 8, wherein the transmit amplifier has a feedback resistor disposed between an inverting input of the transmit amplifier and the series resistor and the receive amplifier has a feedback resistor disposed between the output of the receive amplifier and the summing node.

10. A modem, coupled to the transmit and receive path of a hybrid as recited in claim 9.

* * * * *